SWITCHING SYSTEM WITH ROUTING CONTROL

Filed Dec. 20, 1963 5 Sheets-Sheet 1

INVENTORS J. W. GORGAS
E. D. MASUCCI
BY
William F. Simpson
ATTORNEY

SWITCHING SYSTEM WITH ROUTING CONTROL

Filed Dec. 20, 1963 5 Sheets-Sheet 5

3,309,467

SWITCHING SYSTEM WITH ROUTING CONTROL

John W. Gorgas, Marlboro Township, Monmouth County, N.J., and Eugene D. Masucci, Columbus, Ohio, assignors to Bell Telephone Laboratories, Incorporated, New York, N.Y., a corporation of New York Filed Dec. 20, 1963, Ser. No. 332,044
9 Claims. (Cl. 179—18)

This invention relates to automatic switching systems for the automatic switching of communications including calls or messages. More particularly, this invention relates to the automatic alternate routing of calls or messages in a communication system.

In communication switching systems having an appreciable number of switching centers, it is frequently desirable to provide for alternate routing between different ones of these centers, so that in case all of the trunks or paths between certain ones of the centers become busy or develop troubles it is desirable to route the calls automatically over other trunks with other centers and then to the desired switching center and called station. In certain networks, it may be desirable to be able to alternately switch a message through more than one terminal switching center to the desired called station. In this case the desired called station will have lines extending to the different terminal switching centers to which the calls may be extended to it.

In such systems alternate routing frequently causes one or the other of two difficulties to be encountered. It sometimes happens that a message will be shuttled back and forth between two of these switching centers and thus make all the trunks busy without being extended to its destination. On other occasions a message may be routed around through a circuitous route and back to one of the switching stations through which it was previously switched. The message may then again be switched around to the same route thus making many trunks busy without advancing the call or message to the station for which it is intended.

A number of alternate routing arrangements have been previously proposed for director control step-by-step systems as well as other types of systems. However, none of these systems includes any solution to the improper routing of the messages under the conditions described above. Thus, it has been proposed to register in each office through which a call is switched the busy and idle condition of all routes tested and, under certain conditions, to transfer this information to other offices. Such an arrangement is quite elaborate and expensive because it requires extensive routing information of all possible routes on all calls at each and every switching office which may be employed to establish such calls under all possible different busy and idle conditions.

Other prior suggestions do not provide sufficient flexibility in that they require unnecessary restrictions on the selection of possible alternate routes at various of the switching offices even though such routes may be available and proper.

In presently employed automatic toll switching arrangements toll calls may be dialed either by an operator or a subscriber. In the arrangement such as disclosed in J. W. Gooderham et al., Patent 2,868,884, January 13, 1959, the switching centers are all arranged in a hierarchy of different rank or orders and the trunking arrangement provided which directs the traffic largely to trunk line routes. However, in cases where there is sufficient traffic between specified locations direct routes are provided and under some circumstances the overflow from the direct routes directed over the trunk line routes. The alternate routing provided is strictly limited so that the above described difficulties in alternate routing are avoided. For example, alternate routing may be employed only from a given station over the direct route or to a switching center having a higher rank in the hierarchy than the station at which the message originates or at least enters the toll system.

The trunk route arrangement and the hierarchy system of switching stations is quite vulnerable from a disaster point of view. If any of the switching stations of high rank or the main line trunk routes are put out of service the entire system will be largely out of service or entire sections cut off one from another.

Accordingly, a group, called a "ring arrangement" herein, of major switching stations is proposed, which stations are of substantially equal rank. In such a switching arrangement the hierarchy method of controlling the alternate routing is not applicable so that the above problems are not encountered.

In accordance with our invention an improved automatic alternate routing arrangement and the control thereof are provided in which a route control digit or signal or digits and signals are appended to the control digits or signals of each call or message. The route control digit or digits are then employed to control the possible alternate routes available to each message or call. This digit or signal may be changed at each of the switching centers through which the message or call is switched depending upon the routing of the call or message at that particular switching center. In this manner the above difficulties of alternate routing are avoided.

In certain switching networks it is desirable to provide different grades of transmission and different grades of service. In accordance with our invention it is possible to provide different routing control between the various switching stations depending upon the class of service or class of transmission required between the various switching stations and between the ultimate calling and called subscribers or message sources.

In order to further improve the security of transmission in case of disaster it is proposed to provide a second group or dual ring network or a multi-ring interconnected network and connect the important subscriber's stations to each of these rings through the appropriate switching stations. Then in case one of the networks becomes inoperative the calls may be switched to another one of the rings.

In accordance with our invention provision has been made to automatically transfer a call which starts on one ring to another ring or network in case trouble develops in subsequent switching stations of a network in which the message started. Under these circumstances routing digits appended to the message may be employed to indicate the network or origin of the message together with other routing control information and thus prevent the shuttling of the message back and forth between the two different networks.

A feature of our invention relates to arrangements which permit the use of a route control digit or signal both in a so-called ring or general network configuration of stations of substantially equal rank and also in systems of the prior art such as the hierarchy system of the nationwide dialing.

Another object of our invention is to employ route control digits which permit a message to be diverted from a private wire system to the commercial or public communication systems which systems may employ different number systems and different directory numbers so that the route control digit or digits may indicate the network of origin of a particular call or message and thus cause this call or message to be automatically directed over alternate routes in the second or public network system to a desired or adjacent station under control of the directing digits or signals which were transmitted in the network of origin of the message or call.

A feature of our invention relates to automatically changing one or more of the routing digits appended to each call or message at the various switching stations depending upon the route or alternate route selected at that particular station for extending the call or message.

Another feature of this invention relates to arranging the various switching stations in an inner ring of a plurality of stations and providing alternate routing between the various stations of this ring. Other stations are arranged around this ring called the middle ring of switching stations and these middle ring switching stations may be connected to a plurality of stations of the inner ring of stations. Surrounding the middle ring is a large plurality of outer ring stations which may be connected to switching stations of the middle ring or directly to the switching stations of the inner ring. Our invention may be extended to provide alternate routing between these stations when desired.

The foregoing and other objects and features of our invention may be more readily understood from the following description when read with reference to the attached drawing, in which:

FIGS. 1, 2 and 3 show exemplary networks in which alternate routing may be provided and controlled in accordance with our invention.

Figures 1, 2, 3:
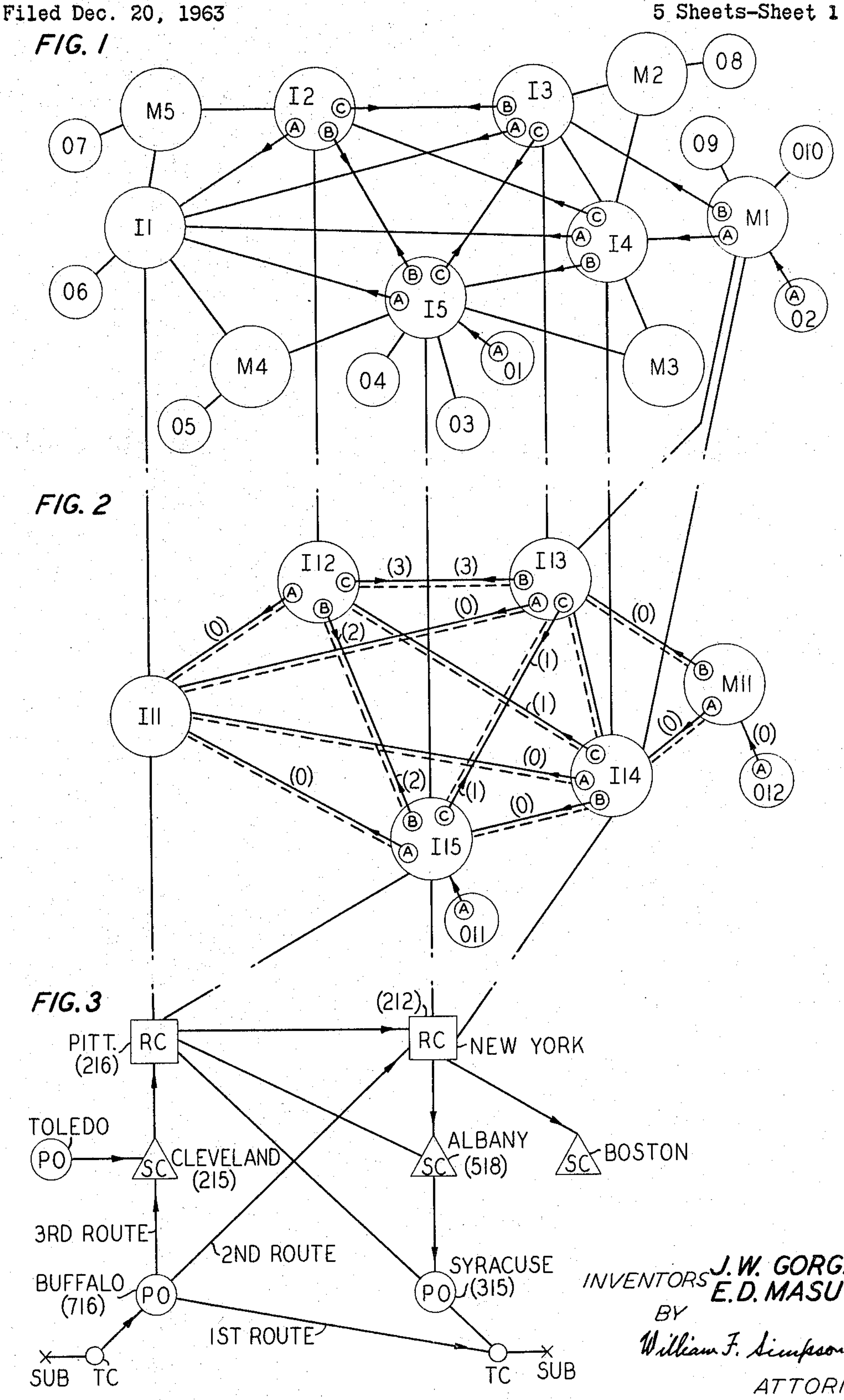
FIG. 1 shows a ring network in which the route control digits or signals in accordance with our invention may be employed to control the alternate routing messages through the various switching centers.
FIG. 2 shows another ring network similar to the ring network shown in FIG. 1 in which two grades of trunks or transmission circuits between the various stations may be provided and the alternate routing for the different grades of transmission controlled differently in accordance with the class of service and alternate routes available.
FIG. 3 shows a small section of another type of network frequently called a hierarchy type of network, the alternate routing of which may be controlled in accordance with our invention by route control digits.

The network shown in FIG. 1 comprises five inner ring switching stations I1, I2, I3, I4 and I5. In addition, middle ring switching stations M1, M2, M3, M4 and M5 are shown. The middle ring station M1 is connected to the inner ring switching centers I3 and I4.

The middle ring station M2 is shown connected to the inner ring centers I3 and I4. Middle ring switching station M3 is connected to the inner ring centers I4 and I5. Similarly, the middle ring station M4 is connected to the inner ring switching centers I1 and I5, while the middle ring station M5 is shown connected to the inner ring stations I1 and I2. Thus as shown in FIG. 1 each of the middle ring stations is connected to two of the inner ring centers and as will be described a message to and from these middle ring stations may be directed alternatively over each of the routes or connections depending upon where the message originates in the system and upon the busy condition of the groups of trunks interconnecting the inner ring stations and also interconnecting the inner ring stations with the middle ring stations. There is no limitation on the number of middle ring stations which may be connected to any inner ring station or any pair of inner ring stations. These connections will be determined by the location of the various switching centers in the inner ring and middle ring and also by the amount of traffic or calls or message to be transmitted between the various stations.

As shown in FIGS. 1, 2 and 3 the various connections are represented by a single line. The connections comprise one or more trunks or transmission paths. These paths or transmission circuits are assumed to be two-way transmission circuits. That is, there will be some transmission circuits represented by the single line in FIGS. 1, 2 and 3 for transmitting messages or setting up calls from station M1 to station I4, for example, and there other trunks or transmission circuits represented by the same line for transmitting messages or calls from station I4 to the switching stations M1. With two-way trunks the same circuit may be used on a call from M1 to I4 or a call from I4 to M1. These trunks or transmission paths may comprise any suitable voice, data, or telegraph paths, channels, or circuits including voice frequency, carrier current, radio, time division, or other pulse systems or any combination of such paths, channels or circuits.

A group of outer ring switching centers is also illustrated in FIG. 1 by the circles designated O1 through O10, inclusive. The outer switching centers O2, O9 and O10 are interconnected with the middle ring station M1. The outer ring station O8 is connected with the middle switching center M2. The outer ring stations O1, O3 and O4 are shown interconnected with the inner ring station I5. In this case no intermediate middle ring station is employed to handle the calls from these outer ring stations. The outer ring station O5 is interconnected with the middle ring station M4 and the outer ring station O6 is interconnected with the inner ring station I1 so that the messages between these stations are not switched through a middle ring station. The outer ring station O7 is interconnected with the middle ring station M5 as shown in FIG. 1.

FIG. 2 shows a similar switching network comprising five inner ring stations I11, I12, I13, I14 and I15. FIG. 2 shows only one middle ring station M11 and one outer ring station O12 connected to a middle ring station M11. A second outer ring station O11 is shown connected to the inner ring station I5.

It is sometimes desirable to increase the security of communications over that provided by a network such as shown in FIG. 1. When desired a second ring such as shown in FIG. 2 may be provided and interconnected with the inner ring stations of FIG. 1 as shown in FIG. 2. Under these circumstances, substantially all of the middle ring stations and also the outer ring stations of the two networks will be the same or identical. In addition to having each inner ring station interconnected with a corresponding inner ring station of the other ring the middle ring stations will be connected to a plurality of inner ring statons in both the inner rings, usually corresponding inner ring stations. Thus, as shown in FIGS. 1 and 2 the middle ring station M1 is interconnected with the inner ring station I3 and I4. This middle ring station is also interconnected with the inner ring stations I13 and I14 of FIG. 2. When a maximum of security is desired each of the middle ring stations of each of the rings will be similarly connected to inner ring stations of both rings. In case outer ring stations are connected directly to the inner ring stations then these outer ring stations also will be interconnected with corresponding inner ring stations of both or all the rings of stations when desired.

The inner ring stations I11 through I15 are shown to be interconnected with each other by means of solid lines which represent the same kind of transmission or communication circuits or trunks as represented by the interconnecting lines between the stations I1 through I5 in FIG. 1. Also the inner stations I11 through I15 shown in FIG. 2 are interconnected by dash lines, in addition to the solid lines. These dash lines represent other communications circuits of a different grade of quality. Thus the solid lines may represent ordinary voice communication trunks or circuits while the dash lines may represent high grade data links or communication circuits or trunks. These two different grades or circuits are merely illustrative of networks which may provide two or more grades of transmission or service. The routing control circuits in accordance with our invention are equally applicable to switching networks which may provide a plurality of different grades of transmission between the various stations thereof.

Assume now that some subscriber connected to the outer office O12 desires to send a message or make a call to office I11 or to some subscriber interconnected directly to this office or to some other middle ring or outer ring office connected to the inner ring office or center I11. In transmitting the message or call from office O12 to the middle ring office M11 it is not essential that a route control digit be appended to the call by the equipment at the office O12. However, if it is desired to append such a digit or signal, under the assumed circumstances, a 0 will be transmitted from the office O12 to the middle ring office M11. The 0 indicates to the middle ring office M11 that there is no restriction on the selection of alternate routes leading from the office M11.

The specific embodiment of our invention set forth herein is arranged to provide a maximum of three different alternate routes leading from any one switching center. All of the maximum number of alternate routes need not be provided at each office and our invention is not limited to a maximum of three different alternate paths leading from any switching office but may be arranged to control any number of paths leading from any switching office and the number of paths leading from any switching office need not be the same as the number leading from the other of the switching offices. In the following description the three possible alternate routes are designated the direct route, the best alternate route, and the second best alternate route indicating merely the order of selection or testing of these routes by the switching office when there is no restriction imposed by the route control digit.

The 0 for a route control digit indicates that no restriction is imposed on the selection of the alternate routes from the office to which the 0 is transmitted.

The route control digit 1 when appended to the control signals of a call indicates that the office to which this digit is transmitted may select the direct route or if all the trunks in this route are busy, then it may select a trunk in the best alternate route, but may not select any trunk in the second best alternate route.

The route control digit 2 when transmitted to a switching office indicates to that office that a trunk in the direct route may be selected or a trunk in the second best alternate route may be selected, but that no trunk in the best alternate route should be selected.

When the route control digit 3 is transmitted to a switching office it indicates to that office that only the direct trunk route may be selected for extending the call toward the called party.

If a larger number of different alternate routes are available at any of the switching offices then a larger number of route control digits may be required to be transmitted to that office to properly restrict the alternate routing from that office so that a call or message will not be transmitted back to an office through which it has already been switched.

Also in accordance with our invention multidigit routing control digits or signals may be appended to the directing signals or codes of the call.

When the assumed message arrives at the middle ring switching center M11 all of the trunks in the trunk group A extending to office I14 will be tested first. If any trunk in this group is idle it will be seized by the switching equipment at the office M11 and the call extended over this trunk to the inner ring switching center I14. Again a 0 route control digit will be transmitted along with all of the other class of service and control code transmitted to the office I14.

At this office three choices are available, the most direct route designated A which extends directly to the inner ring office I11. If there is an idle trunk in this group of circuits this route is selected and the route control digit transmitted is a 0 indicating that if there are any additional alternate routes available between the station I11 and the called station, alternate routing may be freely employed at this office I11.

If all of the trunks in the most direct trunk group A between office I14 and I11 are busy then the equipment in office I14 will test the trunks in the first best alternate route or group of trunks designated B in office I14. If some one of these trunks is found idle then the call will be extended over this trunk and as shown in the drawing a route control digit of 0 transmitted to office I15, thus indicating that an idle trunk may be freely selected in any of the alternate routes, A, B, or C leading from office I15.

If a trunk in the most direct group A is found to be idle the call will be extended over this trunk and a routing digit of 0 transmitted over the trunk to the office I11.

If, however, all of the trunks in group A, between office I15 and I11 are busy, then the equipment in office I15 will test the trunks in the best alternate route B extending to office I12. If one of the trunks in this group is idle the call will be extended over this trunk to the office I12 and a routing digit 2 appended to the call. A 2 is appended in this case because the best alternate route trunks are not available from office I12 since this would merely send a call back to office I15 if all of trunks in the most direct route from office I15 are busy. Consequently, under these circumstances without excluding the best alternate route from office I12 a message would shuttle back and forth between offices I12 and I15 until all the trunks of this trunk group were busy on a single call.

At office I12 the equipment will search for an idle trunk in the most direct trunk group A extending to office I11. If a trunk is found idle in this group it will be seized and the call extended over this trunk route to the office I11. As shown in the drawing a route control digit of 0 may be transmitted to office I11 thus permitting the free selection of alternate routes at office I11 when necessary or desirable.

If all of the trunks of this group are busy then the trunks in the second best alternate route, group C will be tested. If an idle trunk is found in this group a call will be extended over this trunk to the office I13. At this time the routing control digit 3 will be appended to the message in place of either the 0 or the 2 previously appended to the message which indicates to the office I13 that only the direct trunk group is available for transmitting the message to the station I11. The best alternate trunk group is not available because this would send the message back to office I12 if all of the trunks between offices I13 and I11 are busy so that the message would merely shuttle back and forth between offices I12 and I13 until all of the trunks in this group were busy with the one call. Likewise, the second best alternate route is not available from office I13 because this extends back to the office I15. Since the messages already have come from office I15 and the trunks in the direct route A at office I15 are busy the message would merely be rerouted to office I12 and then to I13 and then I15 and so on until all of the trunks in this ring were busy. Thus, at office I13 the route control digit 3 prevents the selection of any of the alternate routes and thus prevents either the shuttling of the message back and forth between offices I13 and I12 or prevents it from going around in a ring between offices I12, I13 and I15. If all of the trunks in the most direct trunk of group A at office I13 are busy then the message must be directed to a busy tone trunk, to an announcement trunk, to an operator, or to another network as will be presently described.

Returning now to office I15, if all of the trunks in the most direct route A and in the best alternate route B are busy then instead of transmitting a message over this group of trunks the trunks to office I13 will be tested. This is the second best alternate route out of office I15 for the message incoming from office I14 as described above. If no trunks are idle in this group then a busy signal will be returned to the calling party or an operator will be connected or the message will be diverted to another network as described herein. Assume that some one of the trunks in the second best alternate route are found to be idle. The message will then be transmitted to the inner ring office I13 and a route control digit 1 or 3 may be appended to it to prevent the message from being shuttled back and forth between offices I13 and I15.

At office I13 the trunks in the most direct group A will first be tested if an idle trunk is found in this group the call will be extended over this trunk to the office I11 and then to the called subscriber. As before, the routing control digit of 0 will be transmited in place of the 1 or 3 office I13 to office I11 are busy and if a route control digit alternate routes may be freely selected.

Alternately, if all of the direct trunks in group A from office I13 to office I11 are busy and if a route control digit of 1 is received then the trunks in the best alternate route B will be tested. If an idle trunk is found in this group then the call will be extended over this idle trunk to the office I12. In this case, however, the route control digit 3 will be substituted for the 1 received at office I13. The route control digit 3 is appended and indicates to the equipment at office I12 that only the direct route should be selected. The second best route C cannot be selected because it would cause the message to shuttle back and forth between offices I12 and I13. Likewise, a trunk in the best alternate route should not be selected because all of the trunks in group A from office I15 to office I11 are busy so that the message would either be shuttled back and forth between offices I12 and I15 or around the ring including offices I12, I15 and I13.

Of course if all of the most direct trunks from office I12 to I11 are busy or if all the trunks of the most direct route A from office I13 are busy and a route control digit of 3 is received then the call will be connected at the respective offices I12 or I13 to busy tone or busy announcement trunk to an operator or to another network as will be described.

The above description of the alternate routes for the call assumed that one of the direct route trunks in group A from office M11 was idle. Similar alternate routes are provided from office M11 over the best alternate group of trunks between office M11 and office I13, if all of the trunks in the most direct trunk group A from office M11 are busy.

When a message is transmitted over an idle one of the trunks in group B from office M11 to office I13 a route control digit 0 will be again transmitted together with the other directing signals indicating to office I13 that alternate routes for the message may be freely selected at office I13 depending upon the busy condition of the trunks of the various routes.

Thus if an idle trunk in the direct group A is found to be idle the message will be transmitted over this trunk from office I13 to the inner ring office I11 and a 0 will again be transmitted as the route control digit.

If all of these trunks are busy then the trunks of the best alternate route group B are tested. If an idle trunk is found in this group a call will be extended over this trunk to the inner ring office I12. A route control digit of either 1 or 3 will be transmitted to the office I12 at this time. As previously described a control digit of 1 was transmitted over an idle trunk of this group when the message arrived at office I13 from office I15 and a 3 was transmitted when the message was transmitted from the station I12 to I13 thus limiting the equipment at station I13 to the selection of an idle trunk in the most direct trunk group extending to the inner ring I11. When desired a 3 may be again transmitted under the present assumed conditions. However, it is possible to transmit a route control digit of 1 at this time since the message arrived over the group of trunks from the middle ring office M11.

If a 1 is transmitted then the message may be transmitted over an idle trunk of the most direct group of trunks or the call may be extended over the best alternate route group B from the inner ring office I12 when all of the trunks in group A are busy. If the message is direct over the best alternate route B at this time a group control digit 3 will be transmitted in place of the 1 received from station I13. The 3 limits the equipment at station I15 to selecting an idle trunk in the direct trunk group A. If a trunk were selected in the group B at station I15 the message would merely shuttle back and forth between stations I12 and I15 while if a trunk in the second best trunk group C at station I15 were selected then the message would merely be successively transmitted around a ring comprising stations I12, I15 and I13.

Returning now to the message at station I13 as received from station M11 and assuming that all of the trunks in the most direct route and all the trunks in the best alternate route B were busy then the trunks in the second best alternate route C would be tested and if an idle trunk is found the call would be extended over this trunk to the inner ring station I15. At this time a route control digit 1 would be transmitted to station I15 indicating that the trunks in the direct trunk route or the trunks in the best alternate route might be tested and selected for extending the call. The trunks in the second best alternate route could not be selected since the digit is 1 because to select trunks in this group would cause the call to be merely shuttled back and forth between stations I13 and I15.

As before, if an idle trunk is found in the most direct trunk group the message or call will be extended over this trunk and a 0 transmitted as the route control digit to the station I11, indicating that if alternate routes exist from the inner ring station to the called station they may be selected freely at the inner ring switching center I11.

If all of the trunks in the most direct group A are busy then the trunks in the best alternate route B will be tested since the route control digit was a 1. If an idle trunk in this group is found the call will be extended over this trunk to the inner ring switching station I12 and a route control digit 3 transmitted with the other control codes and information or signals thus limiting the selection of a route at station I12 at this time to the direct trunk group A. It would be improper to permit selections of the best alternate route in trunk group B at station I12 since under these circumstances the message would merely shuttle back and forth between stations I12 and I15. Likewise, it would be improper to permit the selection of any trunk in the second best alternate group, group C because in this case the message would merely be repeatedly transmitted around a ring comprising stations I13, I15 and I12. On in still other and different calls which employ the trunks of the various trunk groups described above the same or other route control digits may be transmitted over these trunks to the various switching centers.

Thus, by the use of the routing control digit in the manner described a plurality of alternate routes may be provided from various inner ring switching stations and between these inner ring switching stations and the middle ring switching stations and also the outer ring switching stations when it is desired to extend the alternate routing to these stations. At the same time the shuttling of the message back and forh between any two of these stations or the extending of circuits around a ring of switching centers is prevented.

Thus the selection of the route control digit for transmission to each of the different switching centers is determined in part by the destination of the message in part by the alternate route selected and in part by the previous paths over which the message or call has been transmitted. As described below the class of call or class of service to be provided may also in part determine the routing control digit transmitted to the next switching center. In FIG. 2 a second group of trunk circuits providing a different grade of transmission is shown connected between the various interswitching stations and also between the middle ring switching station M11 and the two inner ring switching stations I13 and I14. It is assumed that these additional groups of transmission circuits or trunk circuits provide a higher grade of transmission such as suitable for high speed data transmission. Such circuits frequently are limited in the number switching points that may be employed due to the transmission difficulties, such as reflection due to mismatch and other causes at the switching stations.

When it is desired to employ high quality transmission circuits and limit the number of switching offices through which a call or message may be extended, the control equipment as described hereinafter is arranged so that each switching point after a predetermined number of switching centers, i.e., the first one in the exemplary embodiment described herein, will cause the routing control digit 3 to be transmitted indicating to the next switching center that only the direct route trunks may be selected.

As described above when all of the trunks of all of the different alternate routes are found to be busy then a call will be directed to a busy tone trunk or to an announcement trunk to indicate the busy conditions to the calling party. When desired instead of routing the call to an announcement trunk or a busy tone trunk a call may be routed to an operator. In addition, when desired the call may be diverted to another network as will be presently described.

When the call is diverted to another network, as for example from station I13 to station I3 in case all of the alternate paths from station I13 are busy, usually a 0 or other route control digit indicating complete freedom of alternate routing in the second network will be transmitted.

Where it is not possible to again divert the call from the second network to the first network, the same group control digits may be employed.

However, when it is possible to again divert the call from the second network to the first network, it is desirable to use other route control digits to prevent the shuttling of the message back and forth between the networks. Thus for example, instead of sending a 0, 1, 2 or 3, route control digit, the route control digits employed for the call in the diverted network may for example be a 5, 6, 7 or 8 respectively and this network will respond to these signals in the same manner as described above for the corresponding 0, 1, 2 and 3 route control digits. However, when the route control digit is 5, 6, 7 or 8 the message will not be diverted back to the system of origin.

Alternatively, different route control digits may be assigned for the same function in the different networks and the route control digits of these characters maintained throughout the switching of the call and thus maintaining identification of the network of origin of the message or call.

Instead of diverting a call to a similar network, such as shown in FIG. 1, calls may be diverted from the network of FIG. 2 to a commercial or public service network such as shown in FIG. 3.

FIG. 3 is similar to FIG. 270 of the above-identified patent of Gooderham et al. except that all of the alternate routes shown in said FIG. 270 are not shown in FIG. 3 and additional alternate routes are shown in FIG. 3.

As shown in FIGS. 2 and 3 the regional center RC for New York is interconnected with the inner ring stations I14 and I15, while the regional center RC for Pittsburgh is interconnected with the inner ring switching centers I11 and I15. Messages from any of these stations may be diverted to the public service network of FIG. 3 in a manner similar to that described above with reference to the networks shown in FIGS. 1 and 2.

If the commercial or public service network of FIG. 3 is identical with the network shown in the above-identified patent of Gooderham et al. then no routing control digit will be transmitted from any of the stations I14, I15 or I11 accompanying the message or call diverted to the public service network of FIG. 3.

Alternatively, if this public service network is modified in accordance with our invention, then routing control digits may be transmitted with the message and employed to control the routing of the message or call with the public service network of FIG. 3 in a manner similar to that described above. As shown in FIG. 3, additional alternate routes have been shown so that the alternate routing of messages through this network under control of route control digits in accordance with our invention may be better understood.

Of course, if circuits in accordance with our invention are incorporated within the public service network of FIG. 3 the alternate-routing arrangement described in the above-identified Gooderham et al. patent will not be employed. For this reason numerous of the alternate routes shown in FIG. 270 of that patent are not shown in FIG. 3.

As will be described herein provision is also made for substituting a high grade transmission path for a call when all of the normal grade transmission paths in the main route and the available alternate routes are busy. At this time the system may be arranged to transmit any one of the desired route control digits over the high grade transmission facilities.

FIGS. 4, 5, 6, and 7 show the modifications to the marker circuits at each of the switching centers which are necessary to incorporate the alternate-route selection control and the transmission of the route control digits accompanying each call or message in accordance with one exemplary embodiment of our invention.

Figure 8:
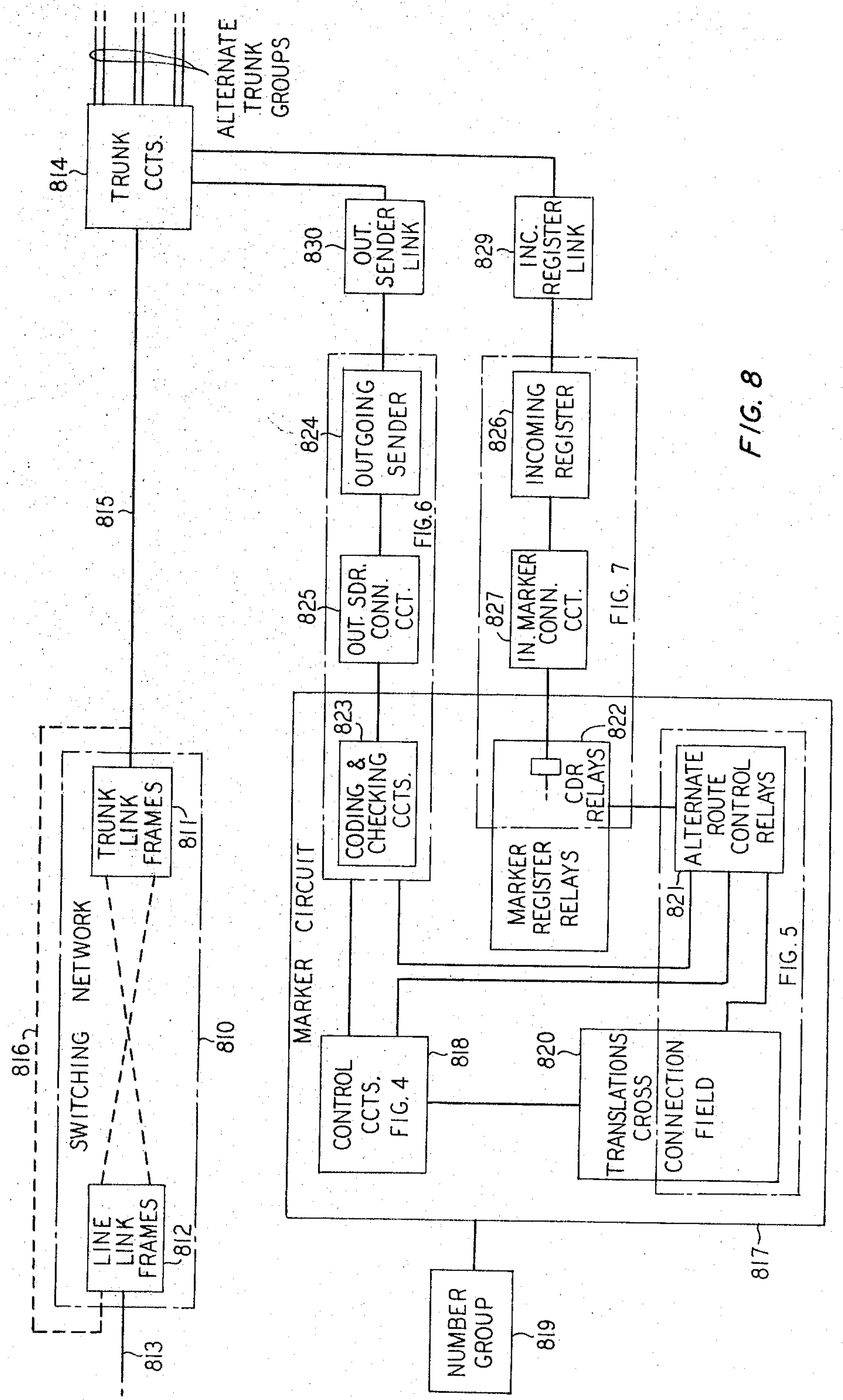
FIG. 8 shows the various elements of an exemplary switching system and the manner in which an exemplary embodiment of our invention is interconnected with and cooperates therewith.

FIG. 8 shows the various elements of an exemplary switching center and the portions of these elements that are modified in accordance with the exemplary embodiment of our invention as shown in FIGS. 4, 5, 6, and 7.

The equipment at each of these centers is of the crossbar type similar to the arrangements essentially described in one or more of the following patents with the addition of the circuits shown in FIGS. 4, 5, 6, and 7; 1,577,033, M. B. Kerr, Mar. 16, 1926; 2,585,904—A. J. Busch—Feb. 19, 1952; 2,587,817—A. J. Busch and H. J. Michael—Mar. 4, 1952; 2,868,884—J. W. Gooderham et al.—Jan. 13, 1959; 3,150,236—J. W. Gorgas, G. A. Hurst, J. S. Pfrommer, W. H. Scheer—Sept. 22, 1964; and 3,157,743—R. C. Avery—Nov. 17, 1964.

As shown in FIG. 8 the switching centers include a switching network 810 comprising line link frames 812 and trunk line frames 811. Various communication lines 813 are connected to or terminate on the line link frames 812. Trunk circuits 814 are connected to the trunk link frames 811. These circuits include incoming, outgoing, and two-way trunks which may be used for incoming, outgoing, or tandem calls. Certain of the trunks, including those used for tandem calls have both a trunk link appearance 815 and a line link appearance 816.

Different groups of these trunks provide the various alternate routes between the different lines.

Figure 4:
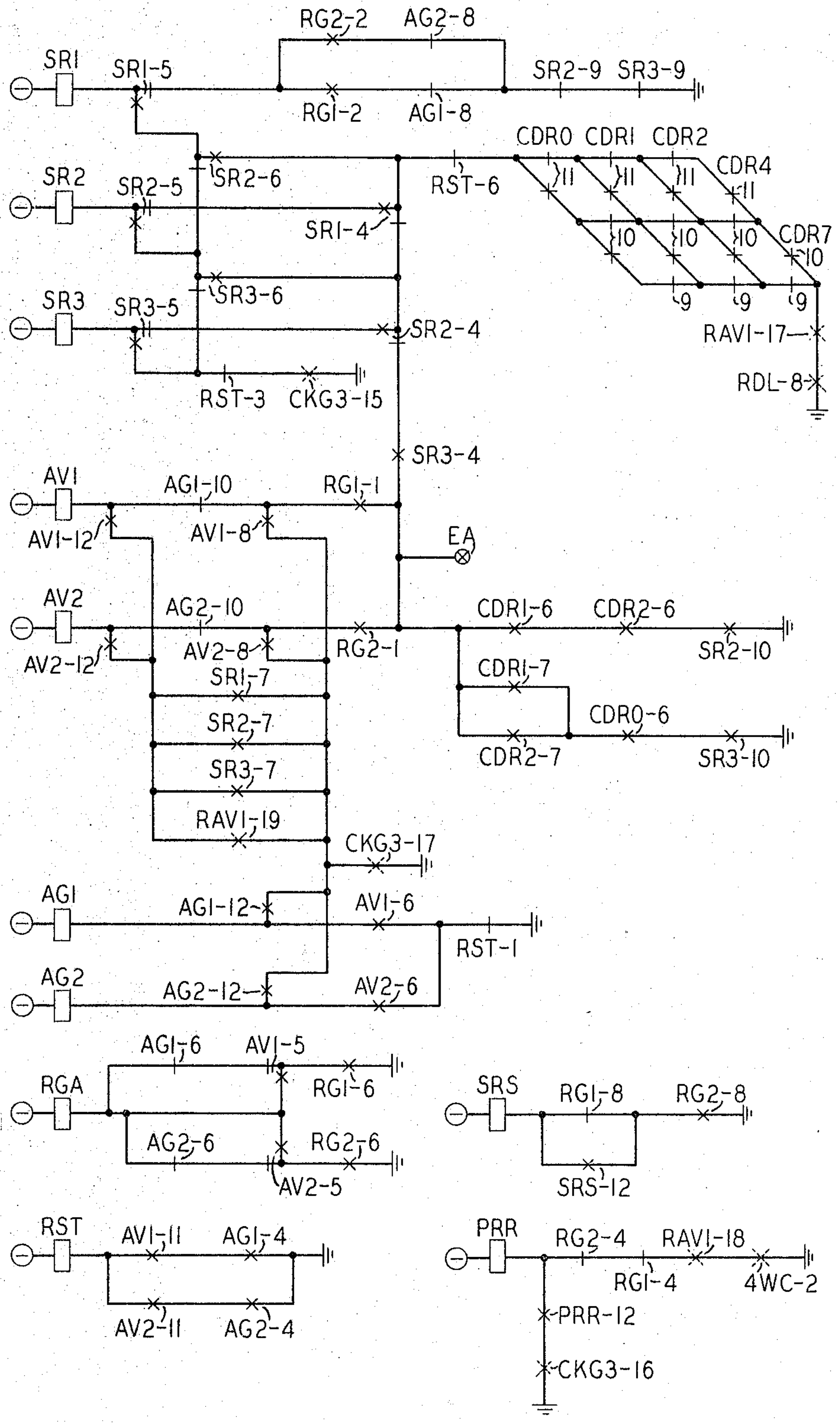
FIG. 4 shows the control circuits for controlling the selection of the routes and alternate routes in accordance with our invention.
Figure 5:
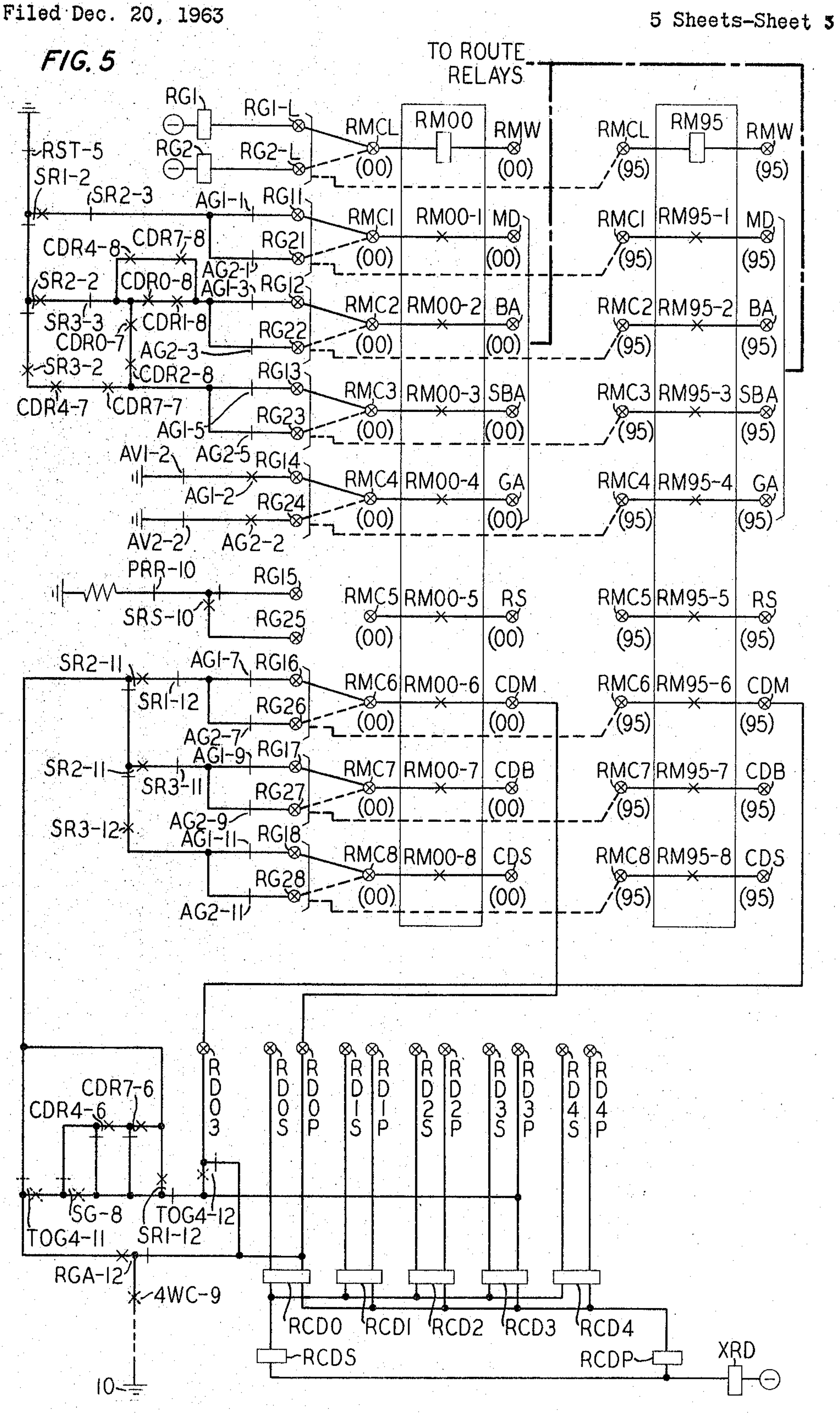
FIG. 5 shows the route program relays and the control circuits, therefor, together with the cross-connecting terminals for selecting the routes.
Figures 6, 7:
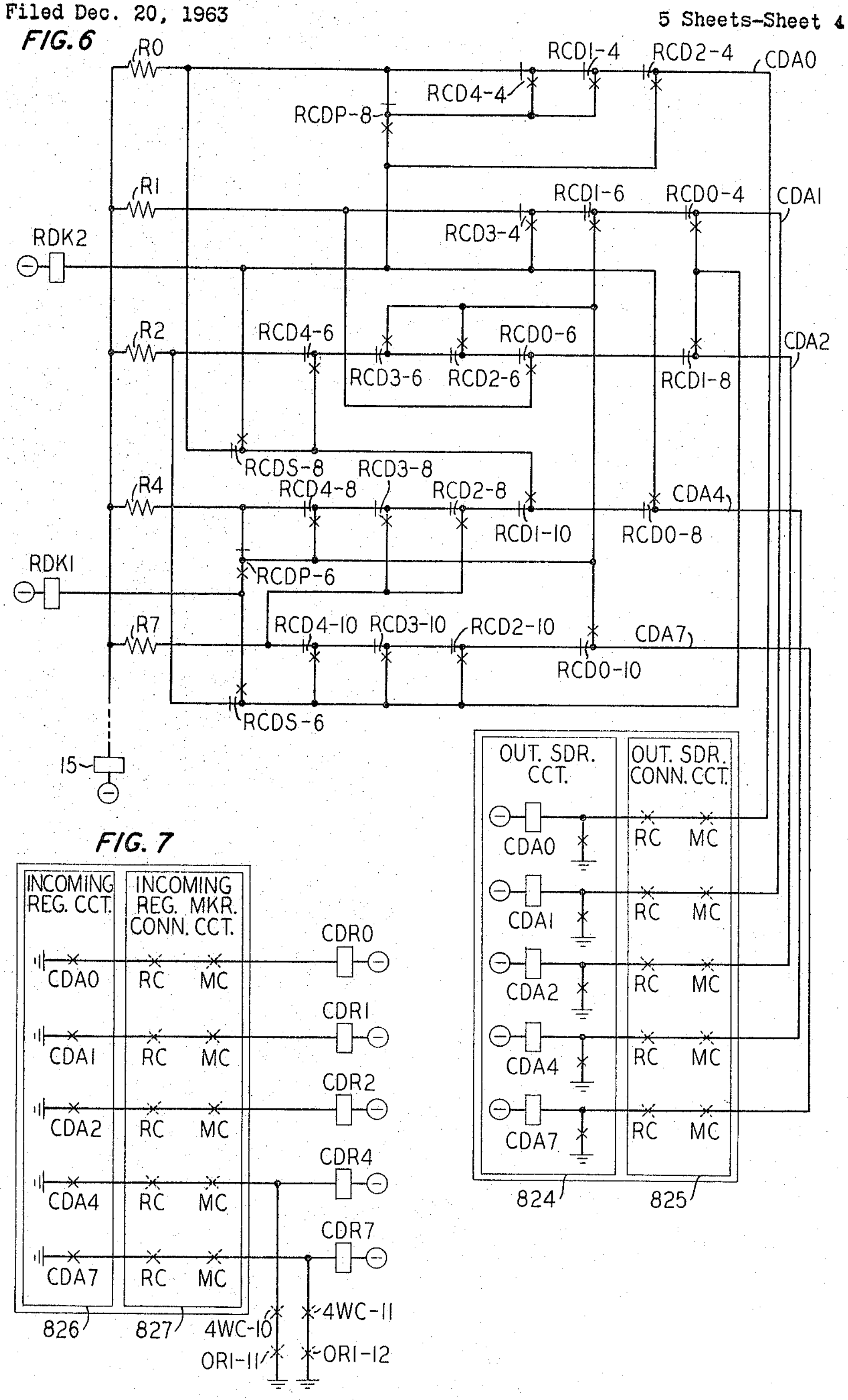
FIG. 6 shows the coding circuits of the routing control digit and the checking circuits for transmitting this digit to the outgoing senders.
FIG. 7 shows the circuits for transmitting the route control digit from the incoming registers to the marker circuit.

The connections through the network 810 are established under control of the marker 817 which includes the control circuits 818 of FIG. 4 as well as other control circuits. The number group circuit 819 is employed for terminating translations. The marker 817 also includes the translation cross-connection field 820 a portion of which is shown in FIG. 5. The alternate route control relays 821 of the marker are also shown in FIG. 5. The register relays 822 in the marker employed to register the route control digit are shown in FIG. 7. Also the coding and checking relays 823 in the marker employed to control the transmission of the route control digit are also shown in FIG. 6 as indicated in FIG. 8.

The outgoing sender 824 and outgoing sender connector 825 are shown in FIGS. 6 and 8. The incoming register 826 and incoming register connector are shown in FIGS. 7 and 8. The incoming register link 829 and the outgoing sender link 830 are also shown in FIG. 8.

As described in the above patents when the marker is advanced to a position to select an outgoing trunk, the office code or first three digits or the first three digits and the service code and class of service and perhaps other digits, are employed to select a code point. This code point is cross connected in a translator or a cross-connection field 820 to a route relay which relay then designates a group of trunks over which the call may be extended.

When alternate routes are not provided from this switching office for the call in question the code point or terminal will still be cross connected in this manner and the various relays described below will not operate.

When alternate routes are provided for the call in question then instead of cross connecting the code point to the route relay, the code point is connected or cross connected through terminals RMW00–RMW95 to one of the relays RM00 through RM95. RM00 and RM95 are represented in FIG. 5. The selected RM relay is operated in series with either of the RG1 or the RG2 relays. One or the other of these relays is cross connected to the other terminal of the RM00 relay through RM95. For example, assume that the selected RM relay 00 is in routing group 1 and has had its winding cross connected to the winding of the RG1 relay. Under these circumstances the RG1 relay operates in series with the RM00 relay. If the selected RM relay had been in the routing group 2 then the RG2 relay would operate; otherwise the operations of the circuit is substantially as will be described with reference to the RG1 routing group.

As a result of the operation of the RG1 relay the RG1–2 contacts shown in FIG. 4 are operated which complete an obvious circuit from ground through the SR3–9 contacts, the SR2–9 contacts, the AG1–8 contacts, the RG1–2 contacts and the SR1–5 break contacts. The SR1 relay then operates and closes its contacts. As a result the SR1–5 make contacts complete a locking circuit extending from the winding of the SR1 relay and the SR1–5 make contacts through the break contacts of the SR2–6 and SR3–6, and RST–3 contacts to ground to the CKG3–15 contacts.

The closure of the SR1–2 contacts, shown in FIG. 5, completes a circuit from ground through the RST–5 contacts, the SR1–2 make contacts, the SR2–3 break contacts, and the AG1–1 break contacts to the cross-connection terminal RG11. This terminal will then be cross connected to the RMC1 terminal of the selected RM relay which under the assumed conditions will be the RMC1(00) terminal. The circuit then extends through the RM00–1 contact to the MD(00) cross-connection terminal. This terminal is in turn then cross connected to the route relay which selects the trunks of the most direct route to the next switching center.

The RG1 relay in operating as decribed above closes the RG1–6 contacts which in turn complete an obvious circuit for the operation of the RGA relay shown in FIG. 4. As a result the transfer contacts RGA–12 are actuated so that the break contact is opened and the make contact is closed.

Assuming that the equipment in FIGS. 4, 5, 6, and 7 is part of a switching center as shown in FIG. 8 and is located in the first switching office, then the tandem relay TOG4 will not be operated. This relay is operated in response to incoming information including the class of service of the call, the incoming trunk or circuit over which the call is received and other call information. As a result TOG4–11 contacts will not be operated at this time.

If the marker finds a trunk in the most direct route idle it will cause the call to be extended over this trunk and in addition completes a circuit from ground 10 in FIG. 5 through the 4WC–9 contacts, the RGA–12 make contacts and then through the TOG4–11 break contacts, the SR1–11 make contacts, the SR2–12 break contacts, and the AG1–7 break contacts to the cross-connection terminal RG16. This cross-connection terminal will be in turn cross connected to a make contact on the selected RM relay such as the cross-connection terminal RMC6–(00) and the circuit then extends through the RM00–6 contacts to the CDM(00) cross-connection terminal. This cross-connection terminal will normally be connected to the RD0P terminal which completes the circuit for the operation of the RCD0 relay in series with the RCDP and the XRD relays, thus conditioning the marker for causing a 0 route control digit to be transmitted as will be described presently. Thereafter the marker will set up the connection in the usual fashion and transmit the necessary information to a sender 824 which has been connected to the selected idle transmission path or trunk in the manner described in the above-identified patents and patent applications. Thereafter the marker including the above circuits are released and restored to normal so they are available for use in establishing other calls through the switching center. If alternate routes are not available or provided for the call so the code point or terminal is cross connected directly to the route relay, then when an idle trunk is found ground 10 extends through contacts 4WC–9 and the break contacts RGA–12 to the windings of relays RCD0 and RCDP. These relays in operating cause a 0 route control digit to be transmitted as described herein.

Alternatively, if alternate routes are provided for the call and if no trunks are available in the most direct route then the marker after testing these trunks in the usual manner instead of connecting ground 10 through the contacts 4WC–9 as described above will cause the contacts RAV–17 to close. These contacts are shown in FIG. 4. The RDL–8 contacts are also closed at this time by the marker and as a result a circuit is completed from ground through the RDL–8 contacts, the RAV1–17 contacts and then through the two-out-of-five checking matrix of contacts on the CDR0, CDR1, CDR2, CDR4 and CDR7 relays. The windings of these relays are shown in FIG. 7.

These relays are included in the marker register relays 822 and are set by the incoming call and incoming register circuit in accordance with the received route control digit. However, if the switching station in question is the first switching station provided with alternate routing to which the call is directed, there will be no route control digit accompanying the call so these relays would not be set by the incoming call. Under these circumstances the OR1 relay will be operated in the marker and the 4WC relay in the marker also operated as described above. Consequently, obvious circuits will be completed through contacts of these relays as shown in FIG. 7 for the operation of the CDR4 relay and the CDR7 relay, thus, automatically registering a 0 on these relays.

Accordingly a path will be completed through the two-out-of-five matrix shown in FIG. 4 comprising the contacts of these relays and then through the break contacts RST–6 on the RST relay and then through the operated SR1–4 contacts to the winding of the SR2 relay, thus causing this relay to operate.

The contacts SR2–6 in operating transfer the locking circuit of the SR1 relay from the ground through the CKG3–15 contacts as described above to the ground through the RDL–8 contacts which operated the SR2 relay. This insures that the SR1–4 contacts remain operated sufficiently long to insure that the SR2 relay locks operated through the SR2–5 contacts, the SR3–6 contacts, the RST–3 contacts and the CKG3–15 contacts. Relay CKG3 is a checking relay in the marker, which operates in the normal operation of the marker.

Then when the RAV1 or the RDL relays release, the contacts RAV1–17 or RDL–8 open and remove the locking ground for the SR1 relay thus causing this relay to release.

At this time with the SR1 released and the SR2 relay operated the above-described circuits to the cross-connection terminals RG11 and RG16 are interrupted, and a similar circuit completed to the RG12 and RG17 cross-connection terminals. The circuit to the RG12 cross-connection terminal may be traced from ground through the RST–5 contacts, the released SR1–2 contacts, the operated SR2–2 contacts, the break SR3–3 contacts and then through either the CDR4–8 and the CDR7–8 contacts or the CDR0–8 and CDR1–8 contacts and finally AG1–3 break contacts to the RG12 cross-connection terminal. The operation of the SR2 relay is employed to direct a marker to first test for and then extend the call over an idle trunk if one is found in the alternate route under test. The marker is free to do this if route control digit is either a 0 indicated by operation of the CDR4 and CRD7 relays or a 1 which is indicated by the operation of the CDR0 and CDR1 relays.

Under the assumed circumstances with a route control digit of 0 entered upon the CDR0, CDR1, CDR2, CDR4 and CDR7 relays, a circuit will be extended to the RG12 cross-connection terminal which in turn is cross connected to the RMC2–00 cross-connection terminal which in turn is connected to a contact on the selected RM relay such as RM00–2. The circuit then extends through the RM00–2 contacts to the BA(00) terminal which is in turn cross connected to a route relay associated with the best alternate route.

As before the marker will test the trunks in this group and if an idle trunk is found the marker will extend the call over this trunk in the usual fashion. In addition ground 10 will be connected within the marker circuit through the 4WC–9 contacts and the RGA–12 operated contacts and then through the normal contacts TOG4–11, the normal contacts SR1–11, the operated contacts SR2–11, the break contacts SR3–11 and the AG1–9 contacts to the cross-connection terminal RG17. This terminal will be cross connected to the RMC7–(00) terminal under the assumed conditions with the RM00 relay assumed to be operated at this time. As a result ground is extended through the RM00–7 contacts to the CDB(00) cross-connection terminal. This terminal will be cross connected to some one of the cross-connection terminals RD0P, RD1P, RD2P or RD3P which in turn causes the corresponding RCD0, RCD1, RCD2 or RCD3 relay to operate in series with the RCDP. As described herein these relays in turn cause the corresponding route control digit to be transmitted first to the outgoing sender and then to the next succeeding switching center.

Assume again that the TOG4 relay is not operated and that a 0 has been entered upon the CDR0, CDR1, CDR2, CDR4, and CDR7 relays, i.e., relays CDR4, and CDR7 are operated, and also assume that all of the paths in the most direct route and all of the paths in the best alternate route are busy. As a result the marker circuit does not apply ground to the 4WC–9 contacts. Instead the RAV1–17 and RDL–8 contacts shown in FIG. 4 are again closed. Closure of these contacts with the SR1 relay released, the SR2 relay operated and the SR3 relay released will complete a circuit from ground through the RDL–8 contacts, the RAV1–17 contacts and then through the two-out-of-five checking contact matrix on the CDR0, CDR1, CDR2, CDR4 and CDR7 relays the break contacts RST–6, the normal contacts SR1–4, the operated contacts SR2–4 and the normal contacts SR3–5 to the winding of the SR3 relay thus causing this relay to operate. The operation of the SR3 relay completes a locking circuit through its SR3–5 contacts and the RST–3 contacts to ground through the CKG3–15 contacts. The operation of the SR3 relay also transfers the locking circuit of the SR2 relay from the ground through the CKG3–15 contacts as described above to a circuit extending from the winding of the SR2 relay, the operated SR2–5 contacts, the operated SR3–6 contacts, the released SR1–4 contacts, the RST–6 contacts, the two-out-of-five checking network of contacts on the route control digit relays CDR0, CDR1, CDR2, CDR4 and CDR7, the RAV1–17 contacts and the RDL–8 contacts to ground, thus maintaining relay SR2 operated and providing sufficient time for the complete operation of the SR3 relay. As before when the RAV1–17 or the RDL–8 contacts open the SR2 relay releases but the SR3 relay remains operated in the above-described locking circuit to ground through the CKG3–15 contacts.

With the SR2 and SR1 relays released and the SR3 relay operated the above-described circuits from ground through the RST–5 contacts to the RG12 cross-connection terminal is interrupted and when the route control digit is a 0 as assumed above, a circuit will be extended from this ground to the RG13 cross-connection terminal.

This circuit extends from ground through the RST–5 contacts, the normal SR1–2 contacts, the normal SR2–2 contacts, the operated SR3–2 contacts the operated CDR4–7 and CDR7–7 contacts and the break AG1–5 contacts. The CDR4–7 contacts and the CDR7–7 contacts will be closed if the CDR4 and CDR7 relays are operated in response to a zero being recorded on the route control digit register relays. The RG13 terminal will be cross-connected to the RMC terminal of the selected RM relay. Under the assumed conditions this will be cross-connected to the RMC3(00) terminal which causes the circuit to be extended through the RM00–3 contacts to the SBA(00) cross-connecting terminal. This terminal will be cross connected with the route relay designating the second best alternate route and the operation of this relay causes a marker to hunt for an idle trunk in this group of trunks. As before when the marker finds an idle trunk in this group it will advance and cause a connection to be set up to this trunk in the usual manner. In addition, a ground 10 will be connected to the 4WC–9 contacts and then transmitted through the operated contacts RGA–12 and through the normal TOG4–11 contacts, the normal SR1–11 contacts, the normal SR2–11 contacts, the operated SR3–12 contacts and the normal AG1–11 contacts to the cross-connecting terminal RG18. This terminal will be cross connected to the RMC8(00) assuming that the RM00 relay is the one selected as described above. Consequently, this circuit is further extended through the RM00–8 operated contacts to the cross-connection terminal CDS(00).

The CDS(00) cross-connection terminal will be cross connected to one of the cross-connection terminals RD0P, RD1P, RD2P or RD3P depending upon the character of the route control digit it is desired to transmit on to the next switching center. As a result the corresponding RCD0, RCD1, RCD2, RCD3 relay and relay RCDP will be operated and cause the proper digit to be first transmitted to the sender and then to the next switching center.

Upon the establishment of the connection for extenling the call and the transmitting of the necessary information to the outgoing sender, the marker will advance and be reset where it is available for use in establishing another connection.

Alternatively, if all of the trunks in the second best route are busy or unavailable as were all of the trunks in the most direct route and in the best alternate route, then instead of connecting ground 10 to the 4WC–9 contacts the marker will cause the RAV1–17 contacts to again close. This time the SR1 relay and the SR2 relay are released and the SR3 relay is operated. As a result the operation of the RAV1–17 contacts completes a circuit from ground through the RDL–8 contacts, the RAV1–17 contacts, the two-out-of-five check matrix network on the CDR0, CDR1, CDR2, CDR4 and CDR7 relays, the RST–6 contacts, the normal SR1–4 contacts, the normal SR2–4 contacts and the operated SR3–4 contacts, the operated RG1–1 contacts and the AG1–10 normal contacts to the winding of the AV1 relay.

The AV1 relay in operating completes several locking circuits for maintaining itself operated from its winding first through contacts AG1–10, contacts AV1–8 to ground through the CKG3–17 contacts; also through the AV1–12 contacts, the operated SR3–7 contacts and the operated RAV1–19 contacts in parallel to ground through the CKG3–17 contacts. The AV1 relay in operating also completes a circuit for the operation of the AG1 relay from ground through the RST–1 contacts and the AV1–6 contacts. The AG1 relay in operating completes a locking circuit for maintaining itself operated from its winding through the AG1–12 contacts to ground through the CKG3–17 contacts.

The operation of the AV1 relay and the AG1 relay completes a circuit for the operation of the RST relay from ground through the operated contacts AG1–4 and the operated contacts AV1–11. The operation of the RST relay interrupts the above-described operating locking circuit for the SR3 relay which relay then releases and in turn interrupts one of the locking circuit for the AV1 relay at contacts SR3–7.

Upon the operation of the AG1 relay the AG1–10 contacts open and interrupt another of the above-described locking circuits of the AV1 relay. The release of the RAV1 relay in the marker causes contacts RAV1–19 to open and interrupt the last of the above-described locking circuits of the AV1 relay. Consequently, this relay now releases while the AG1 relay remains operated.

With the AG1 relay operated and the AV1 relay released a circuit is completed in FIG. 5 from ground through the AV1–2 contacts and the AG1–2 contacts to the cross-connection terminal RG14. Under the assumed conditions terminal RG14 will be cross connected to the RMC4(00) cross-connection terminal. This causes a circuit to be extended through the RM00–4 contacts to the GA(00) cross-connection terminal.

The GA(00) cross-connection terminal may be cross-connected to any one of a large plurality of different route relays or other cross-connection terminals. For example, if it is desired to return a busy signal to the subscriber at this time, this terminal will be cross connected to a route relay designating the busy tone trunks whereupon the marker will extend the call to such a busy tone trunk and cause a busy tone signal to be transmitted to the calling subscriber.

Alternatively, if it is desired to extend the call to an announcement trunk in place of the busy tone, then the terminal GA(00) will be cross connected to a route relay designating such an announcement trunk.

In case the marker is arranged to provide for group advance, the GA(00) terminal may be cross connected to a RM-terminal within the marker whereupon the marker will pick another RM relay which may designate still other additional alternative routes. Such an RM relay may designate routes of high grade transmission circuits if they are idle, or it may designate high priority routes of circuits if they are idle. In each of these cases suitable route control digits may be transmitted over the selected routes. The circuits respond to the operation of the second RM relay in a manner similar to the response to the operation of the first RM relay. However, if the first RM relay is cross connected to the RG1 relay then the second RM relay will be cross connected to the RG2 relay. Then the AV2 and AG2 relays will operate instead of the AV1 and AG1 as described herein. When desired the first RM relay selected may be cross connected to the RG2 relay and the second RM relay selected to the RG1.

Alternatively, the cross-connection terminal GA(00) may be cross connected to route relays designating trunks to another network and these route relays may have contacts connected to them which may in turn be cross connected to some one of the RDC relays and cause the desired route control digit to be transmitted with the call or message to the other network. The route control digits are not limited to 0, 1, 2 or 3 but may include other digits and also more than one digit and when desired one of the digits may indicate the network of origin of the call or message.

To transmit one of the digits 0 to 4 cross connections extend to the corresponding terminal RD0P through RD4P which cause relay RCDP and the corresponding relay RCD0 through RCD4 to operate. To transmit one of the digits 5 to 9 the cross-connection terminals RD0S through RD4S are employed. Thus for these digits relay RCDS and one of the relays RCD0 through RCD4 operate. Relay XRD operates in the above circuits only under trouble conditions.

In the above description it was assumed that the switching station, at which the route control equipment shown in the FIGS. 4, 5, 6 and 7 was located, was the first switching station in the network providing alternate routing. As a result, it was assumed that the TOG4 relay in the marker would not be operated in response to the translations of the incoming information accompanying the call or message.

Assume now that the switching station at which this equipment is located is at a tandem switching station which is not the first one of the switching stations providing alternate routing through which the call or message has been switched. Unter these circumstances the translating equipment associated with the marker will cause the TOG4 relay to operate in response to the incoming information or codes accompanying the call or message.

When the route control digit of 0 is received at a tandem switching center the route control circuits at the intermediate and final switching centers for selecting a trunk in the most direct, best alternate or second best alternate route operate in a manner similar to the operation described above at the first switching station at which automatic route control is provided by means of route control digits accompanying the message or call. However, the circuits for the control of the transmission of the route control digits from these other switching centers operate differently.

With the TOG4 relay operated, the TOG4–11 contacts will be operated and change the circuit from ground 10 through the 4WC–9 contacts and the RGA–12 contacts. In this case, the circuit will then extend through the operated TOG4–11 contacts, the normal SG–8 contacts to the contacts of the CDR4–6 on the CDR4 relay. If a zero is registered on the route control register relays at this time, this circuit then extends through the operated contacts CDR4–6 and CDR7–6 and then to the contacts of the SR1–11 of the SR1 relay. Except as pointed out above, under these circumstances the circuits operate in substantially the same manner as described above.

If, however, the received route control digit is not a zero the circuits in accordance with the exemplary embodiment of our invention described herein operate in a different manner. If the route control digit is a 1, a 2, or a 3, the SR1 relay is operated as described above and causes the marker to select and test the trunks of the most direct route in the manner described above.

If an idle trunk is found in this group the marker connects ground 10 to the 4WC9 contacts as before. However, the circuit from this ground now extends through the operated contacts RGA–12 and TOG4–11, the normal contacts SG–8, and then either the normal contacts CDR4–6 or the operated contacts CRD4–6 and the normal contacts CDR7–6 and the operated contacts SR1–12 and SR1–11, and the normal contacts SR2–12 and AG1–7 to the RG16 cross-connection terminal. The terminal is cross connected to control the transmission of the route control digit in the manner described above. If a route control digit other than 0 has been received relays CDR4 and CDR7 will not both be operated.

If an idle trunk is not found in the most direct route the marker causes the relays RAV1 and RDL to operate and these relays in turn cause the SR2 relay to be operated and then the SR1 relay to release. If the route control digit 1 has been received, relay CDR0 and CDR1 will be operated so a circuit extends from ground through the normal contacts RST–5 and SR1–2, the operated contacts CR2–2, the normal contacts SR3–3, the operated contacts CDR0–8, and CDR1–8 and the normal contacts AG1–3 to the cross-connection terminal RG12. This terminal is cross connected as described above so as to cause the marker to search for an idle trunk in the best alternate route group of trunks. If the route control digit 2 has been received then the marker will employ the second best alternate route instead of the best alternate route. Under these circumstances the CDR0 relay and CDR2 relay will be operated. Consequently, a path is not completed from ground through the RST–5 contacts to the RG12 cross-connection terminal as described above. Instead a path is completed to the RG13 cross-connection terminal from ground through the RST–5 contacts, the SR1–2 contacts, the SR2–2 contacts, the SR3–3 contacts, the CDR0–7 contacts and the CDR2–8 contacts and the AG1–5 contacts to cross-connection terminal RG13. This terminal is cross connected as described above with the result that the maker will test for an idle trunk in the second best alternate route in the manner described herein.

If a route control digit of 3 has been received, then in response to the SR2 relay operating a circuit is shown in FIG. 4 extending from ground through the SR2–10 contacts, the CDR2–6 contacts, the CDR1–6 contacts, the RG1–1 contacts and the AG1–10 contacts to operate the AV1 relay. The operation of the AV1 relay causes the circuits to advance as described herein.

If an idle trunk is found either in the best alternate route when the route control digit 1 is received or in the second best alternate route when the route control 2 is received the specific embodiment of our invention shown in FIGS. 4 and 5 is arranged to automatically transmit the route control digit 3. However, when desired the circuits may be arranged so that it is necessary, under these circumstances to provide the cross connections required to cause other desired route control digits to be transmitted.

When an idle trunk is found in either of these trunk groups at the tandem switching center, as described above, the marker supplies ground 10 to the 4WC–9 contacts. However, at this time, the circuit extends from this ground through the operated contacts 4WC–9, RGA–12, and TOG4–11, the normal contacts SG–8, the normal contacts CDR4–6 or the operated contacts CDR4–6 and the normal contacts CDR7–6, and the normal contacts SR1–12 and through the windings of relays RCD3, RCDP, and XRD to battery. As a result relays RCD3 and RCDP operate and cause the route control digit 3 to be transmitted first to the outgoing sender 824 and then to the next switching center as described herein.

If an idle trunk is not found by the marker under the assumed conditions, then instead of applying ground 10 to the contacts 4WC–9, the marker causes relays RAV1 and RDL to operate. These relays cause relay SR3 to operate and relay SR2 to release. At this time relay CDR0 and either relay CDR1 or relay CDR2 will be operated so a circuit is completed for the operation of relay AV1 from ground through the operated contacts SR3–10, CDR0–6, either CDR1–7 or CDR2–7, and RG1–1 and the normal contacts AG1–10 to the winding of the AV1 relay.

The operation of the AV1 relay causes the circuits to advance as described above.

When no alternate routes or only one alternate route is provided it still may be desirable to provide and employ an RM relay to change or control the route control digit transmitted to the next switching center. Under these conditions the cross-connection terminals from the selected RM relay which correspond to terminals BA(00) or SBA(00) will be cross connected to the EA terminal of FIG. 4. Then when the SR2 or SR3 relay operates as described above the AV1 or AV2 relay will be operated instead of a route relay. Consequently, the marker will be advanced as described above in response to the operation of the AV1 relay.

When it is necessary or desirable to provide special grade transmission circuits, it is usually necessary to also limit the number of switching points at which the circuits may be switched. Thus it is usually desirable to transmit the route control digit 0 at the first switching center as the route control digit and thereafter to transmit the route control digit 3 as the route control digit thus allowing only one switching center to provide alternate routing.

In order to use the special grade transmission circuits, the calling subscriber will transmit a preassigned class-of-call digit or class-of-service digit which digit together with the various directing codes or digits will be employed to select one of the RM00 through RM95 relays. Even if the call is directed to the same destination as a call not requiring the extra grade transmission, different RM00 through RM95 relays will be selected at each of the switching centers for directing the two different calls. The RM relay selected for the special grade transmission calls, relay RM(95) for example, will have its contacts interconnected with different route relays which route relays direct the marker circuits to first hunt for idle trunks and then extend the call over such a trunk when found in groups of trunks which provide the required extra grade of transmission required on the call.

The code digit cross-connection terminal for the most direct route similar to the cross-connection terminal CDM(95) for special grade transmission circuits will be cross connected to either the RD03 or the RD0P cross-connection terminal. If the equipment is at the final tandem switching point so that the most direct route is in fact the only route, the RD0P terminal will be used. Otherwise the RD03 terminal usually will be used.

Then when an idle trunk is found in the trunk group under test, the marker will apply the ground 10 to the 4WC–9 contacts as described above. This ground is then transmitted through the RGA–12 contacts and when the equipment is in the originating switching office through the break contacts of the TOG4–11 and then through the SR1–11 contacts, the SR2–12 contacts, the AG1–7 contacts and the RM(95)–6 contacts which are connected to the CDM(95) cross-connection terminal and this in turn is cross connected to the RD03 terminal. The ground then is transmitted through normal TOG4–12 contacts to the RCD0 relay winding thus causing this relay to operate and in turn cause a 0 route control digit to be transmitted as described herein.

Alternatively, if the equipment is at an intermediate tandem switching point then the TOG4 relay will be operated and since it is a special service call the SG relay in the marker will be operated. At this time the ground 10 will be transmitted through the 4WC–9 contacts, the RGA–12 contacts, the operated TOG4–11 contacts, the operated SG–8 contacts, the SR1–12 contacts to the SR1–11 contacts, the SR2–12 contacts and the AG1–7 contacts to the cross-connection terminal RG16. From here it is cross connected to and transmitted through contacts RM95–6 on the selected RM95 relay to the RD03 cross-connection terminal as described above. With the TOG4 relay operated, the ground will be transmitted through the operated contacts TOG4–12 to the windings of the RCD3, RCDP and XRD relays thus causing relays RCD3 and RCDP to be operated and in turn cause a route control digit of 3 to be transmitted to the next switching center.

If on such a special service call at an intermediate or final switching point a trunk is not found in the first trunk group the marker will advance and operate the RAV1 and RDL relays. The SR2 relay will then operate and relay SR1 release as described above. The BA(95) or SBA(95) terminal will be cross connected to the EA terminal so the AV1 or AV2 relay will operate at this time as described above and cause the marker circuits to advance.

FIG. 6 shows the manner in which the contacts of the RCD0, RCD1, RCD2, RCD3, RCD4, RCDP and RCDS relays are interconnected to translate the setting of these relays into a two-out-of-five code representing the various digits to be transmitted. For the digits 0 to 4 relay RCDP and one of the relays RCD0 through RCD4 are operated by cross connecting to the corresponding terminal RD0P through RD4P. For route control digits 5 to 9 relay RCDS and one of the relays RCD0 through RCD4 are operated by cross connecting to the corresponding terminals RD0S through RD4S. The two-out-of-five code is then transmitted through the out-sender connector circuit to the out-sender where relays are operated to represent these digits for later transmission to the succeeding switching office. The usual check circuit relays RDK1 and RDK2 are provided as well as the check relay of 15 which checks for trouble grounds on the five leads extending to the outgoing sender connector circuit and outgoing sender.

If more than one route control digit is to be employed, then additional circuits similar to FIG. 6 will be provided for each of the digits and controlled by the additional relays similar to the relays of FIG. 6.

If the RM(00) relay, for example, is cross connected to the RG1 relay, then terminal RG15 will be cross connected to the RMC5(00) terminal. If the RM(00) relay, for example is cross connected to the RC2 relay, then terminal RG25 will be cross connected to terminal RMC5(00). In either case when relay RM(00) operates ground will usually be applied to terminal RS(00). Terminal RS(00) is cross connected to a route series relay for charging purposes. Only one route series relay is operated on a call and that one in response to the operation of the first route or RM relay. Thus, if the marker operates a route relay before any RM relay, then the RM relay will be operated by the RAV1 relay in the marker. As a result the PRR relay will be operated and open the contacts PRR10 in FIG. 5 and prevent the operation of a route series relay in response to the operation of the selected RM relay.

If the first route relay to be operated is an RM relay and if this relay is cross connected to the RG2 relay, then in response to the closure of the RG2–8 contacts the SRS relay operates and transfers the operating circuit of the cross connected route series relay from the RG15 terminal to the RG25 terminal.

It is to be understood that the above-described arrangements are illustrative of the application of the principles of the invention. Numerous other arrangements may be devised by those skilled in the art without departing from the spirit and scope of the invention.

What is claimed is:

1. In combination in a communication switching system, a first switching station, a second switching station, signaling routes extending from said switching stations, means at said first station for transmitting over said signaling routes extending from said first station different alternate route signals in addition to call selecting signals, and switching means at said first station responsive to the selection of one of said routes between said stations to control the character of alternate route signals to designate different ones of said alternate routes at said second station with which said selected route between said stations may be interconnected at said second station, said switching means including means for determining particular alternate route signals independently of the availability of said alternate routes at said second station.

2. A communication switching system comprising in combination a plurality of switching stations, signal transmission paths extending between said stations, switching means at said stations for selecting said paths, signal transmitting means at a plurality of said stations for transmitting a plurality of different route control signals in addition to selecting signals over said paths, and means at a first of said stations responsive to the selection of one of said paths to a second of said stations for controlling independently of the paths available at said second station the selection of one of the different route control signals to be transmitted over said selected path to said second station.

3. In combination a first communication switching network comprising a first plurality of switching stations, a first plurality of signaling paths interconnecting said first plurality of switching stations, switching means at said stations for selecting said paths, a second communication network comprising a second plurality of switching stations and a second plurality of signaling paths interconnecting the switching stations of said second network, means responsive to the failure of said switching means at one of said first plurality of switching stations to find an idle path for diverting a call to the second of said networks, and means for transmitting route control signals with said call for preventing the return of said call to said first network.

4. In combination, a first communication switching network comprising a plurality of first switching stations, a first plurality of alternate groups of signaling paths interconnecting said first switching stations, means for selecting one path of said first plurality in response to a control signal in a first code set, a second communication switching network comprising a plurality of second switching stations, a second plurality of groups of alternate signaling paths interconnecting said second switching stations, means for selecting one path of said second plurality in response to a control signal in said first code set, means for interconnecting certain of said first and said second switching stations, and means responsive to a control signal of said first set received over said interconnecting means for generating a control signal of a second set.

5. In combination in a communication switching network, a first, a second, and a third switching center, switching means at said switching centers for establishing different alternate routes between said centers, means at said first center for selecting a first routing control signal independently of the availability of alternate routes at said second center, means at said first center for automatically transmitting said first routing control signal to said second switching center to prevent the selection of a predetermined one of said different alternate routes at said second switching center, means at said second center for selecting a second routing control signal independently of the availability of alternate routes at said third center and means at said second switching center and responsive to said first selected routing control signal and to the particular alternate route selected for automatically transmitting said second routing control signal to said third switching center to prevent the selection of a predetermined one of said different alternate routes at said third switching center.

6. In combination in a communication switching system, a first switching center, a second switching center, signaling paths extending between said centers, a plurality of alternate routes extending from said second switching center, means at said first center for selecting a route control signal independently of the availability of the alternate routes extending from said second center, signal transmitting means at said first center for automatically transmitting said selected route control signal in addition to selecting signals over said paths to said second center, and means at said second switching center responsive to said route control signal and to said selecting signals for selecting one of said routes therefrom and for automatically transmitting over said selected one route a further selected route control signal.

7. In combination in a communication switching system, a plurality of switching centers, a first class of signaling paths extending between said switching centers, a second class of signaling paths also extending between said switching centers, switching means at said switching centers for establishing independent connections through said switching centers between selected paths of either of said classes of said paths, said switching means including at a first one of said switching centers transmitting apparatus for selectively transmitting a routing signal over any of said paths upon the establishing of a path thereto for designating independently of the availability thereof, groups of selectable paths from a second or subsequent switching centers.

8. A communication switching system in accordance with claim 7 in which said subsequent switching center includes means responsive to said routing signal received over a path of said first class for preventing the selection of predetermined groups of said first class of signaling paths at said subsequent switching center.

9. A communication switching system in accordance with claim 7 in which subsequent switching centers include means responsive to routing signals transmitted to them over paths for limiting the number of said switching centers through which paths of said second class may be interconnected.

References Cited by the Examiner

UNITED STATES PATENTS

| | | | |
|---|---|---|---|
| 2,857,467 | 10/1958 | Molnar | 179—18.21 |
| 3,098,125 | 7/1963 | Berch | 179—18.21 |
| 3,155,775 | 11/1964 | Zarouni | 179—18.21 |
| 3,211,836 | 10/1965 | Warman | 179—18.21 |
| 3,231,676 | 1/1966 | Carlstrom et al. | 179—18.21 |

KATHLEEN H. CLAFFY, *Primary Examiner.*

L. A. WRIGHT, *Assistant Examiner.*